United States Patent
Winter

(10) Patent No.: US 7,440,681 B2
(45) Date of Patent: Oct. 21, 2008

(54) METHOD AND APPARATUS FOR DETERMINING MAIN PARAMETER VALUES OF A STORAGE MEDIUM THAT ARE REQUIRED FOR REPLAYING SAID STORAGE MEDIUM

(75) Inventor: Marco Winter, Hannover (DE)

(73) Assignee: Thomson Licensing, Boulogne Billancourt (FR)

( * ) Notice: Subject to any disclaimer, the term of this patent is extended or adjusted under 35 U.S.C. 154(b) by 947 days.

(21) Appl. No.: 10/415,788

(22) PCT Filed: Nov. 5, 2001

(86) PCT No.: PCT/EP01/12775

§ 371 (c)(1),
(2), (4) Date: May 5, 2003

(87) PCT Pub. No.: WO02/41315

PCT Pub. Date: May 23, 2002

(65) Prior Publication Data

US 2004/0044831 A1    Mar. 4, 2004

(30) Foreign Application Priority Data

Nov. 17, 2000  (EP)  ................................. 00250383

(51) Int. Cl.
*H04N 5/00* (2006.01)
(52) U.S. Cl. ............................ 386/125; 711/4; 369/47.1
(58) Field of Classification Search ................ 386/125; 711/4; 369/47.1
See application file for complete search history.

(56) References Cited

U.S. PATENT DOCUMENTS

| 5,471,441 A | 11/1995 | Nonaka et al. ................. 369/32 |
| 6,134,196 A | 10/2000 | Sato et al. .................. 369/44.27 |
| 6,343,182 B1 * | 1/2002 | Kim et al. .................... 386/126 |

FOREIGN PATENT DOCUMENTS

| EP | 0834876 | 4/1998 |
| JP | 05054396 A | 3/1993 |
| JP | 05120844 A | 5/1993 |
| JP | 08287474 A | 11/1996 |
| JP | 11273082 A | 10/1999 |
| JP | 200311427 A | 11/2000 |
| WO | 99/12164 | 3/1999 |

OTHER PUBLICATIONS

Nihin Kikaku Kyokai, "JIS Handbook Information Processing, Hardware", 1st Edition, Apr. 29, 1999, pp. 941, 962-965, 1032, 1054-1059 (Japan).
Search Report dated Apr. 8, 2002.

* cited by examiner

*Primary Examiner*—Thai Q. Tran
*Assistant Examiner*—Girumsew Wendmagegn
(74) *Attorney, Agent, or Firm*—Joseph J. Laks; Harvey D. Fried; Patricia Verlangieri

(57) ABSTRACT

A DVD disc contains a lead-in area that contains sync sectors, control data including the number of recording surfaces, disc keys and other information, and contains a Data Area occupying the main part of the available disc surface or surfaces. In order to handle the content of the disc it is necessary to know the control data and disc keys. According to the invention, the data content of the Data Area is used to determine the necessary control data, without reading information from the a lead-in area.

10 Claims, 5 Drawing Sheets

Figure 1:
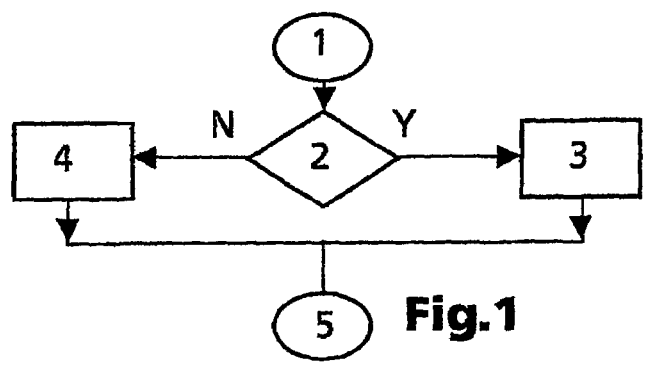

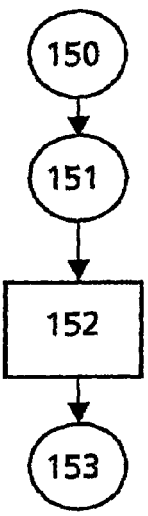
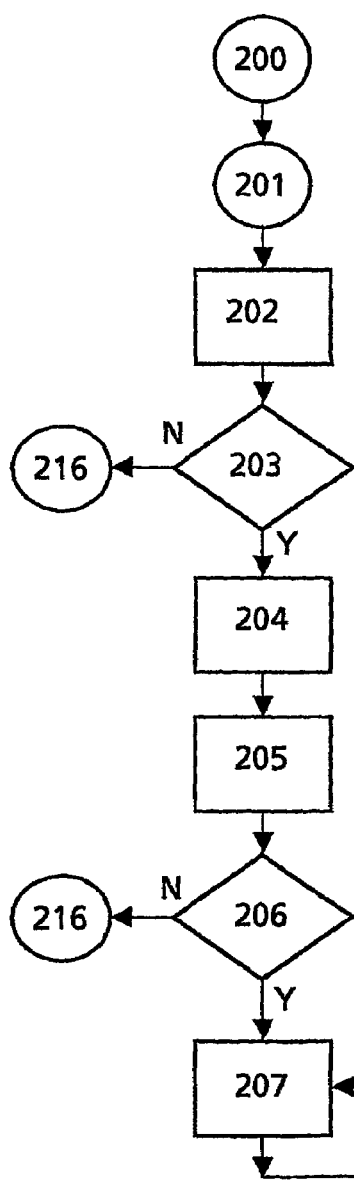
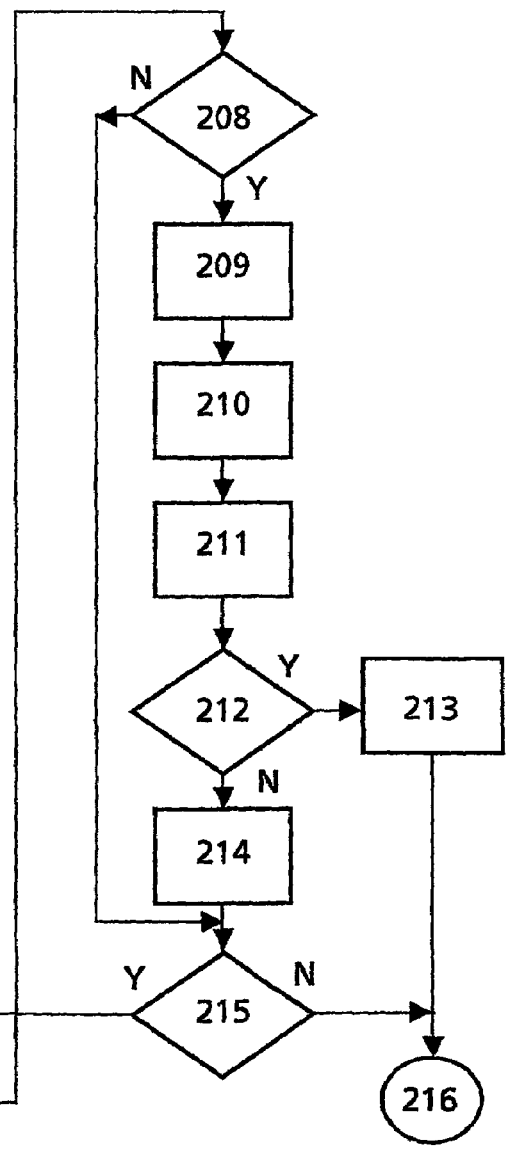
Fig.8
Fig.9

METHOD AND APPARATUS FOR DETERMINING MAIN PARAMETER VALUES OF A STORAGE MEDIUM THAT ARE REQUIRED FOR REPLAYING SAID STORAGE MEDIUM

This application claims the benefit, under 35 U.S.C. § 365 of International Application PCT/EP01/12775, filed Nov. 5, 2001, which was published in accordance with PCT Article 21(2) on May 23, 2002 in English and which claims the benefit of European patent application No. 00250383.7, filed Nov. 17, 2000.

The invention relates to a method and to an apparatus for determining main parameter values of a storage medium that are required for replaying said storage medium, wherein said storage medium includes a first data area, in which said main parameter values are stored, and a second data area not containing said main parameter values but other data.

BACKGROUND

A DVD disc contains a small lead-in area that contains sync sectors, control data including the number of recording surfaces, disc keys and other information, and contains a data area occupying the main part of the available disc surface. In order to handle the content of a DVD Video disc it is necessary to transform a logical sector number denoted LSN into a physical sector number denoted PSN. A DVD disc may contain up to four recording surfaces.

If there is more than one recording surface to be accessed, U.S. Pat. No. 5,966,721 discloses how to make the content of the lead-in areas of multiple recording surfaces readable from one surface only.

INVENTION

A problem to be solved by the invention is to determine important data parameters, which are stored in the lead-in area of the disc and which are required for replaying the disc, from other data read from the non-lead-in area of the disc, without reading the required data parameters from the lead-in area. This problem is solved by the method disclosed in claim 1. An apparatus that utilises this method is disclosed in claim 9.

According to the invention, the content of the disc Data Area is used to determine the necessary information for a transformation between LSN and PSN numbers without reading information from a lead-in area denoted Lead In.

For determining the important or main parameters, the following Data Area data are used:
 characteristic file system data at the beginning of Layer 0;
 DVD Video specific data located at the beginning of Layer 0;
 sector IDs;
 if Layer 1 is present, DVD Video specific data located at the inner radius of Layer 1;
 if Opposite Track Path disc is present, the structure of DVD Video specific data located at the outer radius of Layers 0 and 1.

Without any view into the Lead In, the proposed procedure determines the location of the Lead In, the Lead Out, the Data Area, the Middle Area (if any), and determines the DVD disc type.

The invention allows to automatically determine the following variables that are denoted in this application as main variables:

disc_type (Single Layer, Parallel Track Path, or Opposite Track Path);
 Start_PSN_Layer_0 (range: 0 ... $FFFFFF_h$);
 End_PSN_Layer_0 (range: 0 ... $FFFFFF_h$);
 Start_PSN_Layer_1 (range: $1000000_h$ ... $1FFFFFF_h$);
 End_PSN_Layer_1 (range: $1000000_h$ ... $1FFFFFF_h$).

The last four of these five variables represent a complete replacement for the information from the Data Area allocation field (BP 4 to 15) described by the DVD Specification for Read-Only Disc, Part 1, Version 1.0, 3.4.1.3.1 Physical Format Information.

In principle, the inventive method is suited for determining at least one main parameter value of a storage medium that is required for replaying said storage medium, wherein said storage medium includes a first data area, in which said at least one main parameter value is stored, and a second data area not containing said at least one main parameter value but other data, and wherein said at least one main parameter value is determined by reading and evaluating data from said second data area, without reading said at least one main parameter value from said first data area.

In principle the inventive apparatus is suited for determining at least one main parameter value of a data disc that is required for replaying said data disc, wherein said data disc includes a first data area, in which said at least one main parameter value is stored, and a second data area not containing said at least one main parameter value but other data, and wherein said apparatus includes:
 means for driving said data disc;
 a pickup for reading data from said data disc;
 a buffer,
 means for controlling said driving means, said pickup and said buffer, and for determining said at least one main parameter value by reading and evaluating data from said second data area, without reading said at least one main parameter value from said first data area.

Advantageous additional embodiments of the invention are disclosed in the respective dependent claims.

DRAWINGS

Figure 2:
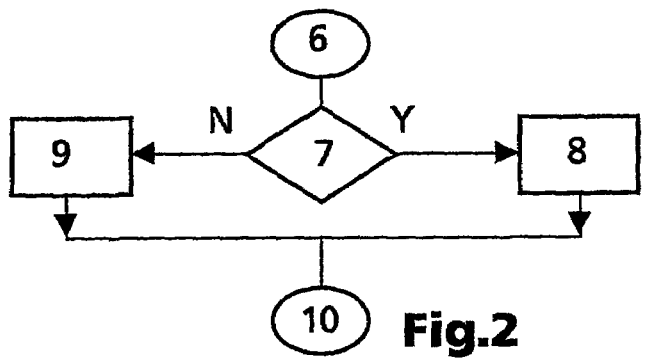
Figure 3:
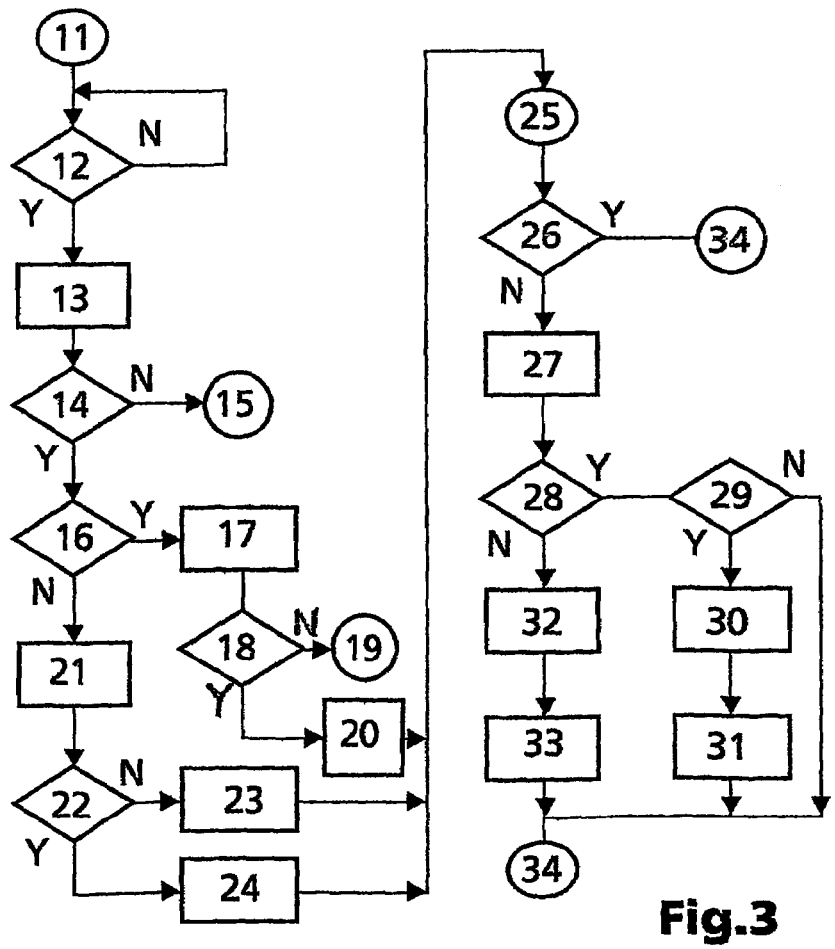
Figure 4:
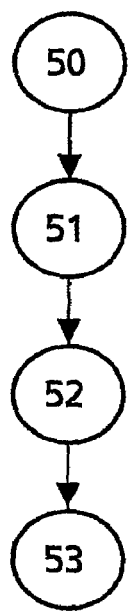
Figure 5:
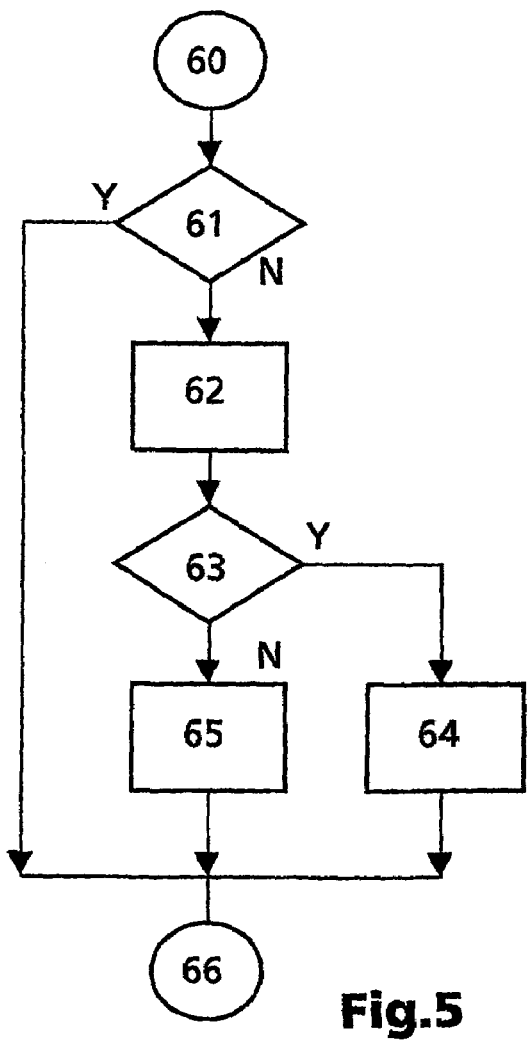
Figure 6:
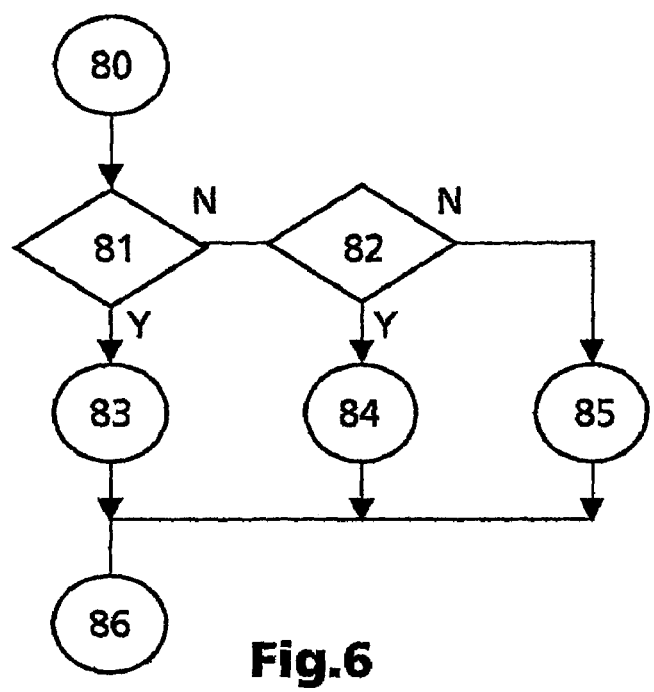
Figure 7:
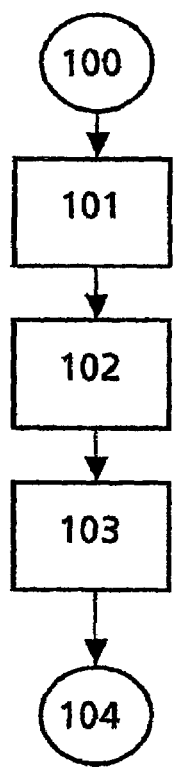
Figure 10:
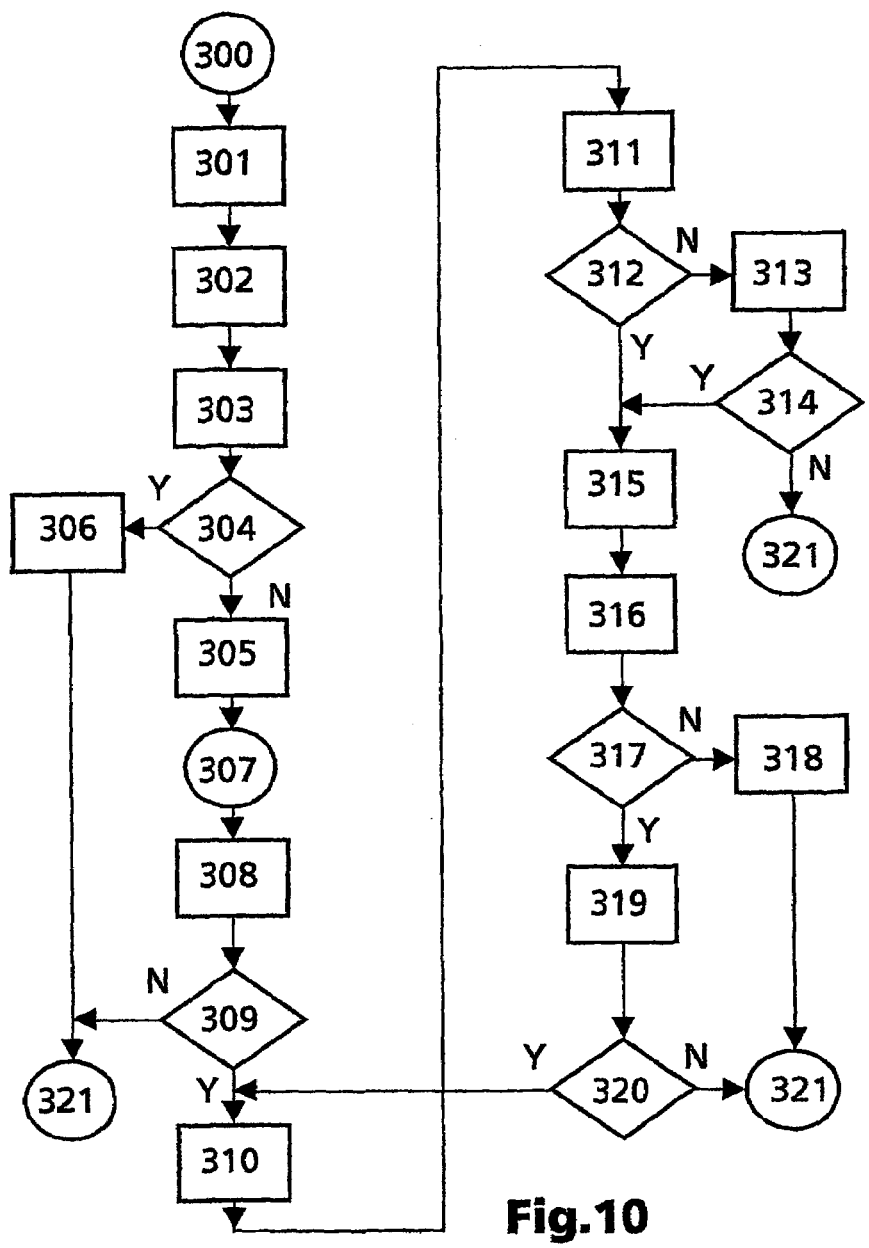
Figure 11:
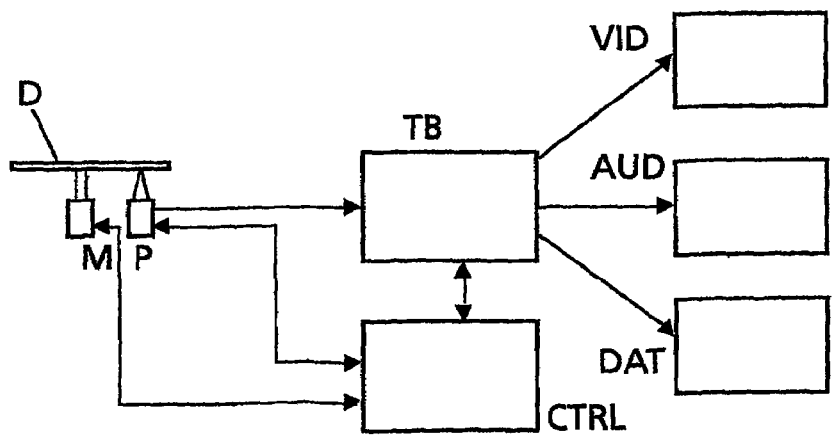

Exemplary embodiments of the invention are described with reference to the accompanying drawings, which show in:
 FIG. 1 transformation from LSN to PSN numbers;
 FIG. 2 transformation from PSN to LSN numbers;
 FIG. 3 method for searching the main variables;
 FIG. 4 basic steps for fast search;
 FIG. 5 function: finding the disc type;
 FIG. 6 function: fast search for main variables;
 FIG. 7 function: find last LSN via partition size;
 FIG. 8 function: find main variables for single layer disc;
 FIG. 9 function: find main variables for parallel track path disc;
 FIG. 10 function: find main variables for opposite track path disc;
 FIG. 11 simplified block diagram of a DVD player.

EXEMPLARY EMBODIMENTS

The above main variables and the way to calculate or determine them are now described in more detail, based on clauses of the DVD Specification for Read-Only Disc, Part 1, Version 1.0.

For DVD Single Layer discs:
disc_type=Single Layer
Start_PSN_Layer_0="Start sector number of the Data Area" in the Lead In as described by 3.4.1.3.1 Physical Format Information, (BP 4 to 15) Data Allocation.
End_PSN_Layer_0 ="End sector number of the Data Area" in the Lead In as described by 3.4.1.3.1 Physical Format Information, (BP 4 to 15) Data Allocation.
Start_PSN_Layer_1 does not exist
End_PSN_Layer_1 does not exist
For DVD Parallel Track Path discs that have two layers:
disc_type=Parallel Track Path
Start_PSN_Layer_0="Start sector number of the Data Area" in the Layer 0 Lead In as described by 3.4.1.3.1 Physical Format Information, (BP 4 to 15) Data Allocation.
End_PSN_Layer_0 ="End sector number of the Data Area" in the Layer 0 Lead In as described by 3.4.1.3.1 Physical Format Information, (BP 4 to 15) Data Allocation.
Start_PSN_Layer_1=$1000000_h$+"Start sector number of the Data Area" in the Layer 1 Lead In as described by 3.4.1.3.1 Physical Format Information, (BP 4 to 15) Data Allocation.
End_PSN_Layer_1=$1000000_h$+"End sector number of the Data Area" in the Layer 1 Lead In as described by 3.4.1.3.1 Physical Format Information, (BP 4 to 15) Data Allocation.
For DVD Opposite Track Path discs that have two layers:
disc_type=Opposite Track Path
Start_PSN_Layer_0="Start sector number of the Data Area" in the Lead In as described by 3.4.1.3.1 Physical Format Information, (BP 4 to 15) Data Allocation.
End_PSN_Layer_0="End sector number in Layer 0" in the Lead In as described by 3.4.1.3.1 Physical Format Information, (BP 4 to 15) Data Allocation.
Start_PSN_Layer_1=$1FFFFFF_h$–End_PSN_Layer_0, i.e. the sector number Start PSN_Layer_1 follows immediately the sector number End_PSN_Layer_0.
End_PSN_Layer_1=$1000000_h$+"End sector number of the Data Area" in the Lead In as described by 3.4.1.3.1 Physical Format Information, (BP 4 to 15) Data Allocation.
The variables PSN and ID are defined as follows:
PSN="Physical sector number", word length 25 bits, Range for Layer 0: 0 . . . $0FFFFFF_h$ Range for Layer 1: $1000000_h$ . . . $1FFFFFF_h$ PSN is identical to the 25 least significant bits of ID.
ID="Identification Data" as described by 3.2.2 Identification Data, i.e. an ID consists of Sector information and a physical sector number PSN.

The two layers of the storage medium may be located at different sides of a disc, or may be located at one side of a multi-layer storage medium that also can be two-sided. It is also possible that the disc has a single layer on one side and two layers on the other side.

In the figures, 'Y' denotes 'yes', 'N' denotes 'no', 'NV_PCK' denotes 'Navigation Pack', ILSBI denotes 'least significant bit'.

The transformation from logical sector number LSN to physical sector number PSN is described in connection with FIG. 1.
1: start
2: LSN≦(End_PSN_Layer_0–Start_PSN_Layer_0)?
3: Area type of ID is Data Area PSN=LSN+Start_PSN_Layer_0
4: Area type of ID is Data Area PSN=LSN+Start_PSN_Layer_1+Start_PSN_Layer_0–End_PSN_Layer_0–1
5:end There is no error handling, i.e. LSN must lie within the range provided by the existing Data Area of the disc.

The transformation from a PSN number to an LSN number is described in connection with FIG. 2.
6: start
7: is the most significant bit (the 25th bit) of PSN zero, i.e. is Layer 0 present?
8: LSN=PSN–Start_PSN_Layer_0
9: LSN=PSN–Start_PSN_Layer_1–Start_PSN_Layer_0+End_PSN_Layer_0+1
10: end There is no error handling, i.e. PSN must point into the existing Data Area of the disc.

The method of searching for the main variables is described in connection with FIG. 3. The main variables will be found in any case. A disadvantage of this method is that a big-distance jump of the optical head between the inner and the outer radius of the disc is required. Such jumps take some seconds. Advantageously, step 16 allows trying first other steps that work much faster. Only in case the faster steps fail, the slow but anyway working processing will be carried out. But tests have shown that the fast version processing steps will find the correct main variables for nearly all of the existing DVD Video discs.
11: start
12: disc inserted?
13: primary volume descriptor pvd=$30010_h$
Assumption that it is a DVD⇒try to read sector PSN=i
14: sector PSN=pvd found?
15: disc is either damaged or not of DVD-ROM type
16: indicates the ID of sector PSN=pvd a Data Area sector (Area type of ID=Data Area)?
17: pvd=$31010_h$
18: indicates the ID of sector PSN=pvd a Data Area sector (Area type of ID=Data Area)?
19: it is not a DVD-Video disc
20: it is a DVD-RAM disc:
disc_type=Single Layer; Start_PSN_Layer_0=$31000_h$
21: For DVD-ROM, DVD-R, DVD-RW and DVD+RW:
Start_PSN_Layer_0=$30000_h$;
Assumption that it is a DVD dual layer disc⇒use the optical head or pick-up position of the same radius as used for reading sector $30010_h$ of layer 0 to read a sector of layer 1.
22: any sector found?
23: disc_type=Single Layer
24: disc_type=Dual Layer (temporary status)
25: try fast processing steps
26: are all types of main variables completely known?
27: jump to the outer radius of the disc, take care of the different radiuses: 8 cm and 12 cm; read successive sectors of layer 0 to locate the border between Data Area and Lead Out or Middle Area;
End_PSN_Layer_0=PSN of the last Data Area sector
28: is there a Lead Out on Layer 0 at the outer radius of the disc?
29: is disc_type=Dual Layer?
30: disc_type=Parallel Track Path
Start_PSN_Layer_1=$1030000_h$;
31: change to layer 1; read successive sectors of layer 1 to locate the border between Data Area and Lead Out;
End_PSN_Layer_1=PSN of the last Data Area sector 32: disc_type=Opposite Track Path;
   Start_PSN_Layer_1=1FFFFFF$_h$-End_PSN_Layer_0;
33: jump to the inner radius of the disc on layer 1 at the radius of sector PSN=30000$_h$; read successive sectors of layer 1 to locate the border between Data Area and Lead Out;
   End_PSN_Layer_1=PSN of the last Data Area sector
34: end Fast Processing Steps for Searching for the Main Variables:
   This type of processing is depicted in FIG. 4.
50: start
51: find disc_type
52: fast search for the main variables
53: end
   Step 51 of FIG. 4 is denoted as function "find disc type" and includes the further steps depicted in FIG. 5.
60: start
61: is disc_type=Single Layer?
62: assume a DVD Parallel Track Path disc⇒use the pick-up position of the same radius as used for reading sector 30010$_h$ of layer 0 to read a sector of layer 1.
63: is sector PSN significantly greater than 1030010$_h$?
64: disc_type=Opposite Track Path
65: disc_type=Parallel Track Path
   Start_PSN_Layer_1=1030000$_h$
66: end This processing can also be desribed as follows: The parameter disc_type can be determined by reading at least one PSN at the beginning of the first disc layer and at least one PSN at the same or a similar radial location in the other disc layer. If the difference between the corresponding PSN numbers from the two layers is significant, it must be an Opposite Track Path disc. If that difference is small, it is a Parallel Track Path disc.

Alternatively, if at the radial location of the first-layer Lead In there is a corresponding Lead In in the other layer, it must be a Parallel Track Path disc. If at the radial location of the first-layer Lead In there is a corresponding Lead Out in the other layer, it must be an Opposite Track Path disc. It is not necessary to read the content of the Lead In. Knowing the sector ID is sufficient, because the sector ID determines whether it is a Lead In or a Lead out or a Data Area.

As a further alternative, one of the possible dual-layer disc types is assumed to be true and the decoding of the disc-stored useful data (e.g. video data or audio data) is started. If errors or inconsistencies will occur in the decoding, a single-sided disc type is assumed to be true and the decoding is tried again. Whether it is a Parallel Track Path or Opposite Track Path disc can be determined by assuming the presence of one of these types, followed by requesting a jump to a different sector number (i.e. a jump in a specific radial direction) and by checking the proper decoding processing.

Step 52 of FIG. 4 is denoted as function "fast search for the main variables" and includes the further steps depicted in FIG. 6.
80: start
81: is disc_type=Single Layer?
82: is disc_type=Parallel Track Path?
83: find the main variables for the Single Layer Disc
84: find the main variables for the Parallel Track Path Disc
85: find the main variables for the Opposite Track Path Disc
86: end In connection with some of the following figures, some processing steps denoted as function "find last LSN via partition size" are required. This function is depicted in FIG. 7.
100: start
101: investigation of the file systems UDF/ISO9660 (Universal Disc Format): find the partition end.
   pvd: last_LSN=Volume Space Size
   Partition Descriptor:
   last_LSN=Partition Starting Location+Partition Length
102: select the higher last_LSN value from both file systems.
103: set the 8 LSBs of the selected last_LSN to '1'.
104: end Step 83 of FIG. 6 is denoted as function "find the main variables for the Single Layer Disc" and includes the further steps depicted in FIG. 8.
150: start
151: carry out function "find last LSN via partition size"
152: End_PSN_Layer_0=Start_PSN_Layer_0+last_LSN
   Remark: End_PSN_Layer_0 may be lower than the PSN of the last logical sector of this disc, but the value found is exact enough for a complete play back of the disc without any restrictions for a user.
153: end Step 84 of FIG. 6 is denoted as function "find the main variables for the Parallel Track Path Disc" and includes the further steps depicted in FIG. 9.
200: start
201: carry out function "find last LSN via partition size"
202: start with reading sectors from PSN=1030000$_h$
203: is one of the read sectors a NV_PCK?
204: store NV_PCK_LBN of this NV_PCK in a variable nv_lbn;
   store PSN of this NV_PCK in variable nv_psn.
205: change into the DVD video title set directory VIDEO_TS;
   investigate the stream files VTS_xx_yy.VOB, wherein xx runs from 1 to 99 and yy runs from 1 to 9;
   search for a VTS_xx_yy.VOB file that is not the last file of a video title and the size of which is less than $2^{20}$-2048 bytes (if any such file exists) and that ends close to sector LSN=last_LSN/2.
206: is there such file?
207: End_PSN_Layer_0=(Start_PSN_Layer_0+last LSN) of that VTS_xx_yy.VOB file;
   set the 8 LSBs of End_PSN_Layer_0 to '1';
   End_PSN_Layer_1=Start_PSN_Layer_0+Start_PSN_Layer_1+last_LSN-End_PSN_Layer_0-1;
208: of the assigned VTS_xx_1.VOB, is start LSN+nv_lbn+Start_PSN_Layer_0+Start_PSN_Layer_1-End_PSN_Layer_0-1 nearby or equal to nv_psn?
209: find the start LSN of the file VTS_xx_yy.VOB (xx: 1 to 99; yy: 0 or 1) for which min (|((last_LSN+1)/2)-nv_lbn-(start LSN of VTS_xx_yy.VOB)|) is true and store this start LSN in a variable vob_lsn
210: End_PSN_Layer_0=Start_PSN_Layer_0+Start_PSN_Layer_1+vob_lsn+nv_lbn-nv_psn-1;
   End_PSN_Layer_1=Start_PSN_Layer_0 +Start_PSN_Layer_1+last_LSN-End_PSN_Layer_0-1;
211: read the video title set information management table VTSI_MAT of the title information file VTS_xx_0.IFO and of the backup title information file VTS_xx_0.BUP (the .BUP file is byte-identical with the .IFO file), which must be located in layer 0 just before the first and in layer 1 just behind the last ".VOB" file of this title.
212: are both VTSI_MATs equal?
213: End_PSN_Layer_0 and End_PSN_Layer_1 are correct
214: End_PSN_Layer_0 and End_PSN_Layer_1 are wrong
215: is there another file VTS_xx_yy.VOB, wherein xx runs from 1 to 99 and yy runs from 1 to 9, that is not the last file of a video title and the size of which is less than $2^{20}$-2048 bytes (if any such file exists) and that ends close to sector LSN=last_LSN/2?

216: end

Step 85 of FIG. 6 is denoted as function "find the main variables for the Opposite Track Path Disc" and includes the further steps depicted in FIG. 10.

300: start

301: search for the border between Lead Out and Data Area of Layer 1

302: End_PSN_Layer_1=least significant 25 bits of the ID of the just found last Data Area sector of Layer 1

303: read sector PSN=End_PSN_Layer_1

304: do the first 16 bytes of this sector's main data identify this sector as an Anchor Volume Descriptor Pointer AVDP with Tag=2 (Tag is a descriptor type indicator)?

305: the AVDP could be damaged; try to locate the Middle Area via the file system 306: End_PSN_Layer_0=((Tag Location of the Descriptor Tag of the AVDP)-(End_PSN_Layer_1-1000000h)+Start_PSN_Layer_0-2)/2;
Start_PSN_Layer_1=1FFFFFF$_h$-End_PSN_Layer_0

307: carry out function "find last LSH via partition size"

308: investigate the stream files VTS_xx_yy.VOB, wherein xx runs from 1 to 99 and yy runs from 1 to 9;
search for a VTS_xx_yy.VOB file that is not the last file of a video title and the size of which is significantly less than $2^{20}$-2048 bytes (if any such file exists) and the last sector of which is as close as possible to LSN=last_LSN/2

309: is there such file?

310: End_PSN_Layer_0=Start_PSN_Layer_0+last LSN of the detected VTS_xx_yy.VOB file;
set the 8 LSBs of End_PSN_Layer_0 to 1;
Start_PSN_Layer_1=1FFFFFF$_h$-End_PSN_Layer_0

311: find the location, or LSN, of the last VTS_xx_0.BUP file of the disc via the file system, wherein xx runs from 1 to 99;
calculate the start PSN of this file:
start_PSN last_BUP=LSN of the last VTS_xx_0.BUP file+Start_PSN_Layer_0 +Start_PSN_Layer_1-End_PSN_Layer_0-1;
jump to sector PSN=start_PSN_last_BUP and read this sector 312: is this sector a vide title set information management table VTSI_MAT?

313: search in the sectors around the assumed PSN for the VTSI_MAT:

314: was search for VTSI_MAT successful?

315: End_PSN_Layer_0=start PSN of the detected VTS_xx_0.BUP file-Start_PSN_Layer_0-Start_PSN_Layer_1+End_PSN_Layer_0+1;
Start_PSN_Layer_1=1FFFFFF$_h$-End_PSN_Layer_0

316: read the VTSI_MATs of the files VTS_xx_0.IFO and VTS_xx_0.BUP, they must be located just before the first and just after the last ".VOB" file of this title 317: are both VTSI_MATs equal?

318: Start_PSN_Layer_0 and End_PSN_Layer_1 are correct

319: Start_PSN_Layer_0 and End_PSN_Layer_1 are wrong

320: is there another file VTS_xx_yy.VOB, wherein xx runs from 1 to 99 and yy runs from 1 to 9, that is not the last file of a video title and the size of which is less than $2^{20}$-2048 bytes (if any such file exists) and that ends close to sector LSN=last_LSN/2?

321: end

Alternative Fast Processing Steps for Searching Critical Ones of the Main Variables:

In case the above described fast processing steps of searching for the critical main variables fail, alternative processing steps can be carried out in order to derive the most important ones of the main variables, in particular End_PSN_Layer_0 for a Parallel Track Path disc, and End_PSN_Layer_0 or Start_PSN_Layer_1 for an Opposite Track Path disc.

For getting End_PSN_Layer_0 for Parallel Track Path discs:

400: search inside the file system for file system descriptors UDF, e.g. File Entry Descriptors, just after the middle of the LSN area of the whole disc. These descriptors are probably located in layer 1 just after the Lead In.

401: estimate the PSN of these descriptors and jump to a PSN just before such an estimated PSN 402: search for these UDF descriptors. The identification can be performed by analysing the first 16 bytes of each sector read. The first 16 bytes of the UDF descriptors contain the Descriptor Tag that provides characteristic information about this descriptor. Therefore an UDF descriptor can be easily recognised.

403: the Tag Location contains a logical sector location of itself. The Tag Location of some descriptors is counted relatively to the start of the partition (File Descriptors, like File Entry Descriptors). Some Tag Locations are identical to LSN (Volume Descriptors, e.g. Anchor Volume Descriptor Pointers).
The Tag Location is used to recalculate End_PSN_Layer_0

404: get the start LSN of the UDF partition from the Partition Descriptor

405: Tag Location of a File Descriptor found:
End_PSN_Layer_0=Start_PSN_Layer_0+Start_PSN_Layer_1+Tag Location+start LSN of the UDF partition-PSN of the Descriptor-1

406: Tag Location of a Volume Descriptor found:
End_PSN_Layer_0=Start_PSN_Layer_0+Start_PSN_Layer_1+Tag Location-PSN of the Descriptor-1

For getting End_PSN_Layer_0 and Start_PSN_Layer_1 for Opposite Track Path discs:

450: search inside the file system for file system descriptors UDF, e.g. File Entry Descriptors, just before the end of the LSN area of the whole disc. These descriptors are probably located in layer 1 just after the Lead In.

451: estimate the PSN of these descriptors and jump to a PSN just before such an estimated PSN 452: search for these UDF descriptors. The identification can be performed by analysing the first 16 bytes of each sector read. The first 16 bytes of the UDF descriptors contain the Descriptor Tag that provides???? characteristic information about this descriptor. Therefore an UDF descriptor can be easily recognised.

453: the Tag Location contains a logical sector location of itself. The Tag Location of some descriptors is counted relatively to the start of the partition (File Descriptors, like File Entry Descriptors). Some Tag Locations are identical to LSN (Volume Descriptors, e.g. Anchor Volume Descriptor Pointers).
The Tag Location is used to recalculate End_PSN_Layer_0 and Start_PSN_Layer_1

454: get the start LSN of the UDF partition from the Partition Descriptor

455: Tag Location of a File Descriptor found:

End_PSN_Layer_0=Start_PSN_Layer_0+Start_PSN_Layer_1+Tag Location+start LSN of the UDF partition−PSN of the Descriptor−1

456: Tag Location of a Volume Descriptor found:
End_PSN_Layer_0=Start_PSN_Layer_0+Start_PSN_Layer_1+Tag Location−PSN of the Descriptor−1

457: Start_PSN_Layer_1=1FFFFFF$_h$−End_PSN_Layer_0

The location of special DVD-Video files may also be used in an analog way, e.g. files VTS_xx_0.IFO, wherein xx runs from 1 to 99. These files are recognisable using a method described in EP-A-1014372 of the same applicant. A comparison of the PSN of the detected VTS_xx_0.IFO file with its location indicated by the file system leads to the calculation of End_PSN_Layer_0.

FIG. 11 shows an optical disk D, which is driven by a motor M and from which data are read by means of a pick-up P. These data are fed to a track buffer TB. The data read are stored in TB in order to compensate for different instantaneous or short-term data rates. The corresponding partial data streams of the buffer-stored data stream are fed from TB into an associated decoder bit buffer. In this case, a video, audio, subpicture, and/or data decoder DAT may be involved, for example. The video decoder VID may be an MPEG video decoder. The audio decoder AUD may be an MPEG or AC3 audio decoder. Instead of a data decoder, it is also possible to use an output interface.

M, P, TB, VID, AUD and DAT are controlled by controlling means CTRL. This controlling means CTRL steers the radial position of pick-up P and the speed of motor M, evaluates the required data read for determining, by carrying out the functional processing steps described, the above mentioned main variables.

The invention can also be used for other types of storage media that have a first data area or data section corresponding to the Lead In and storing the main variables or main parameter values, and have a second data area or data section for other data.

The invention claimed is:

1. Method for determining a main parameter value of a storage medium that is required for replaying said storage medium, said storage medium including:
multiple physical data sectors;
multiple logical data sectors different from said physical data sectors;
a lead-in area containing said main parameter value;
an other data area that is different from said lead-in area and that does not contain said main parameter value but contains other data,
wherein said main parameter value is an end physical sector number for said storage medium and said main parameter value is determined by the steps of:
reading data from said other data area without reading said main parameter value from said lead-in area;
evaluating said data from said other data area without reading said main parameter value from said lead-in area.

2. Method according to claim 1, wherein said storage medium is a DVD disc, e.g. a DVD Read-Only or DVD Video disc.

3. Method according to claim 1, wherein a start physical sector number for said storage medium and eventually a type of said storage medium are further main parameter values.

4. Method according to claim 1, wherein said storage medium includes at least two data layers, to each of which a specific one of said led-in area is assigned.

5. Method according to claim 4, wherein said storage medium has at least one DVD Read-Only Opposite Track Path disc side and said main parameter value is an end physical sector number for the first one of said at least two data layers of said disc, or is a start physical sector number for the second one of said at least two data layers of said disc.

6. Method according to claim 4, wherein said storage medium has at least one DVD Read-Only Parallel Track Path disc side and said main parameter value is an end physical sector number for the first one of said at least two data layers of said disc, and a further main parameter value is a start physical sector number for the second one of said at least two data layers of said disc.

7. Method according to claim 5, wherein said main parameter value and said further main parameter values include a start physical sector number and said end physical sector number for the first one of said at least two data layers of said disc, and include a or said, respectively, start physical sector number and an end physical sector number for the second one of said at least two data layers of said disc, and eventually includes a type of said disc.

8. Method according to claim 1, wherein said storage medium is a DVD Video disc, and wherein for determining said main parameter or parameters or said disc type the following or other data area data are used:
characteristic file system data at the beginning of Layer 0;
DVD Video specific data located at the beginning of Layer 0;
sector IDs;
if Layer 1 is present, DVD Video specific data located at the inner radius of Layer 1;
if an Opposite Track Path disc is present, the structure of DVD Video specific data located at the outer radius of Layers 0 and 1.

9. Apparatus for determining a main parameter value of a data disc that is required for replaying said data disc, said data disc including:
multiple physical data sectors;
multiple logical data sectors different from said physical data sectors;
a lead-in area containing said main parameter value;
an other data area that is different from said lead-in area and that does not contain said main parameter value but contains other data,
said apparatus including:
means for driving said data disc;
a pickup for reading data from said data disc;
a buffer,
means for controlling said driving means, said pickup and said buffer, and for determining said main parameter value by reading and evaluating data from said other data area, without reading said main parameter value from said lead-in area, wherein said main parameter value is an end physical sector number for said storage medium.

10. Apparatus according to claim 9, wherein said data disc is a DVD Video disc, and wherein for determining said main parameter or parameters or said disc type the following or other data area data are used:
characteristic file system data at the beginning of Layer 0;
DVD Video specific data located at the beginning of Layer 0;
sector IDs;
if Layer 1 is present, DVD Video specific data located at the inner radius of Layer 1;
if an Opposite Track Path disc is present, the structure of DVD Video specific data located at the outer radius of Layers 0 and 1.

* * * * *